UNITED STATES PATENT OFFICE.

J. W. CARPENTER, OF PONTIAC, MICHIGAN.

IMPROVEMENT IN PROCESSES FOR PREPARING WHEAT FOR GRINDING.

Specification forming part of Letters Patent No. 7,647, dated September 17, 1850.

*To all whom it may concern:*

Be it known that I, JOSEPH W. CARPENTER, of Pontiac, in the county of Oakland and State of Michigan, have invented a new and useful process of preparing wheat and other grain for grinding into flour and meal and for purifying and preserving the said grains; and I hereby do declare that the following is a full, clear, and exact description.

The nature of my invention or discovery relates to treating of wheat and other grains with an acid or a mixture of acids to remove humidity from the grain and make the skin or hull more easy of separation from the flour or starchy part of the grain with a less pressure of the millstones in reducing the grain to flour or meal, thereby producing a greater amount of fine meal or flour from a given quantity of grain, (about seven per cent.;) also, giving to the grain for storage or carriage in vessels greater preservative qualities.

To enable others to make, compound, and use my invention or discovery, I will proceed to describe it and the manner of applying it.

To prepare one hundred bushels of grain for grinding or flouring I take ten quarts of good vinegar of about $3°$ hydrometer strength. To this quantity of vinegar I add one hundred drops of nitric acid and one hundred drops of sulphuric acid. These acids are mixed together and applied to the hundred bushels of grain by sprinkling it upon and stirring the grain while springling; or it may be applied to the grain from a sprinkling-faucet while the grain is passing along from an elevation through a mill-conductor or conveyer. Various plans, according to circumstances, may be employed to apply this mixture to the grain. The grand object is to diffuse it evenly among the grain. After this acidulous composition is applied to the grain it (the grain) is suffered to lie on the mill-floor, or in a receptacle, for about three days, when it will be in a proper state for grinding, and the hull or skin of the grain is then easier of separation from the starchy part of the wheat or grain with less pressure of the millstones. Consequently there is less bran and more fine flour produced, as all bran derived from wheat not prepared in this way contains a great deal of fine flour matter. If the grain is suffered to lie more than three days after being prepared as stated, it becomes too brittle for grinding, and has to be resprinkled before it is ground.

The good effects set forth produced by the acidulous composition described may be produced by vinegar alone, or vinegar and any one of the acids mentioned, or with vinegar and chlorine acid; but I prefer the composition specified, only I vary its strength according to the dampness of the grain to be operated on. For very damp grain I use vinegar of $6°$ hydrometer strength. Vinegar, therefore, is the principal acid which I use to produce the desired results spoken of. As this acidulous composition dispels moisture from grain, it therefore renders it capable of being stored away in granaries or vessels with but little danger of heating and spoiling. If there is any garlic in wheat which has been treated with this acidulous composition, it is rendered so light as to be easily blown away from the wheat in a separator. It affects other impurities common to wheat in the same manner. Owing to the small quantity of the composition used, the result of many experiments, no deleterious effect, but the good results stated, are produced, while the grain is rendered whiter in the color, and the flour produced has a more snowy appearence.

This composition and the manner of applying it produce as good results upon Indian corn as upon wheat.

The expense of the composition and the applying of it to grain is very small in comparison with the good results which are effected by it.

Having thus explained my invention, I claim—

The application of an acidulous composition to wheat or other grain, the said composition being principally vinegar; but I do not limit my claim to the exact composition of acids as herein described, while the same effects can be produced by the vinegar alone, or when combined with one or more of the other acids, especially with the sulphuric acid, for the purposes set forth.

JOSEPH W. CARPENTER.

Witnesses:
SAMUEL E. BEACH,
EBEN C. BEACH.